US006891879B2

(12) United States Patent
Peterson et al.

(10) Patent No.: US 6,891,879 B2
(45) Date of Patent: May 10, 2005

(54) MICROLASER CAVITY ASSEMBLY AND ASSOCIATED PACKAGING METHOD

(75) Inventors: Brian Lee Peterson, Charlotte, NC (US); Clark Emory Tooly, Fort Mill, SC (US)

(73) Assignee: Litton Systems, Inc., Los Angeles, CA (US)

( * ) Notice: Subject to any disclaimer, the term of this patent is extended or adjusted under 35 U.S.C. 154(b) by 24 days.

(21) Appl. No.: 10/252,600

(22) Filed: Sep. 23, 2002

(65) Prior Publication Data
US 2004/0057490 A1 Mar. 25, 2004

(51) Int. Cl.$^7$ .............................. H01S 3/115; H01S 3/10; H01S 3/08
(52) U.S. Cl. .......................... 372/107; 372/12; 372/21; 372/22; 372/92; 372/98
(58) Field of Search ................................ 372/107, 101, 372/34, 36, 21, 22, 43, 109, 12, 92, 98

(56) References Cited

U.S. PATENT DOCUMENTS

| | | | |
|---|---|---|---|
| 4,665,529 A | | 5/1987 | Baer et al. |
| 4,731,795 A | * | 3/1988 | Clark et al. ................. 372/107 |
| 4,827,485 A | | 2/1989 | Scerbak et al. |
| 5,050,179 A | * | 9/1991 | Mooradian ................... 372/44 |
| 5,181,214 A | * | 1/1993 | Berger et al. ................. 372/34 |
| 5,394,413 A | | 2/1995 | Zayhowski |
| 5,561,684 A | | 10/1996 | Martin |
| 6,072,815 A | | 6/2000 | Peterson |
| 6,229,829 B1 | * | 5/2001 | Yin ............................. 372/22 |

FOREIGN PATENT DOCUMENTS

| | | |
|---|---|---|
| DE | 37 45 125 C2 | 12/1987 |
| JP | 06224494 | 8/1994 |

* cited by examiner

Primary Examiner—Don Wong
Assistant Examiner—Armando Rodriguez
(74) Attorney, Agent, or Firm—Alston & Bird LLP

(57) ABSTRACT

A cavity assembly includes a mounting member, an active gain medium, at least one electro-optic component and at least one alignment assembly. The mounting member defines an aperture within which the active gain medium is disposed, and is comprised of a thermally conductive material. The alignment assemblies are disposed relative to the active gain medium, and are configured to receive the electro-optic components such that electro-optic components at least partially align with the active gain medium. The alignment assemblies are rotatably disposed relative to the active gain medium such that relative rotation of the alignment assemblies and the active gain medium alters the alignment of the respective electro-optic components with respect to the active gain medium. The cavity assembly may be mounted within a thermally conductive housing to transfer heat away from the active gain medium.

32 Claims, 11 Drawing Sheets

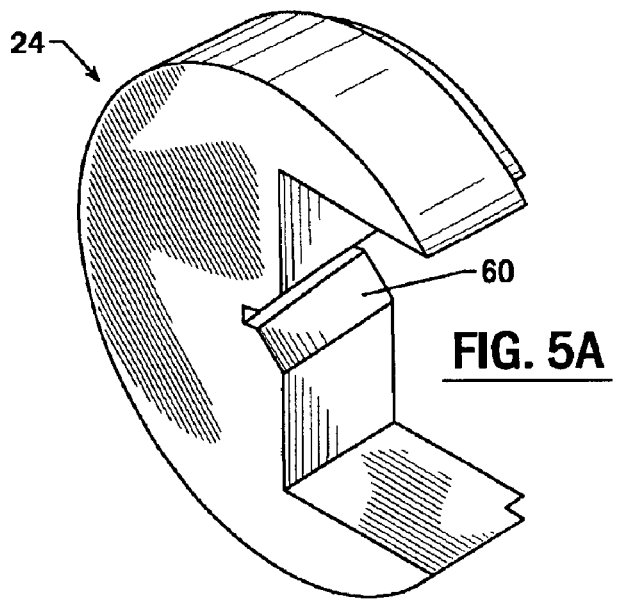
FIG. 5A
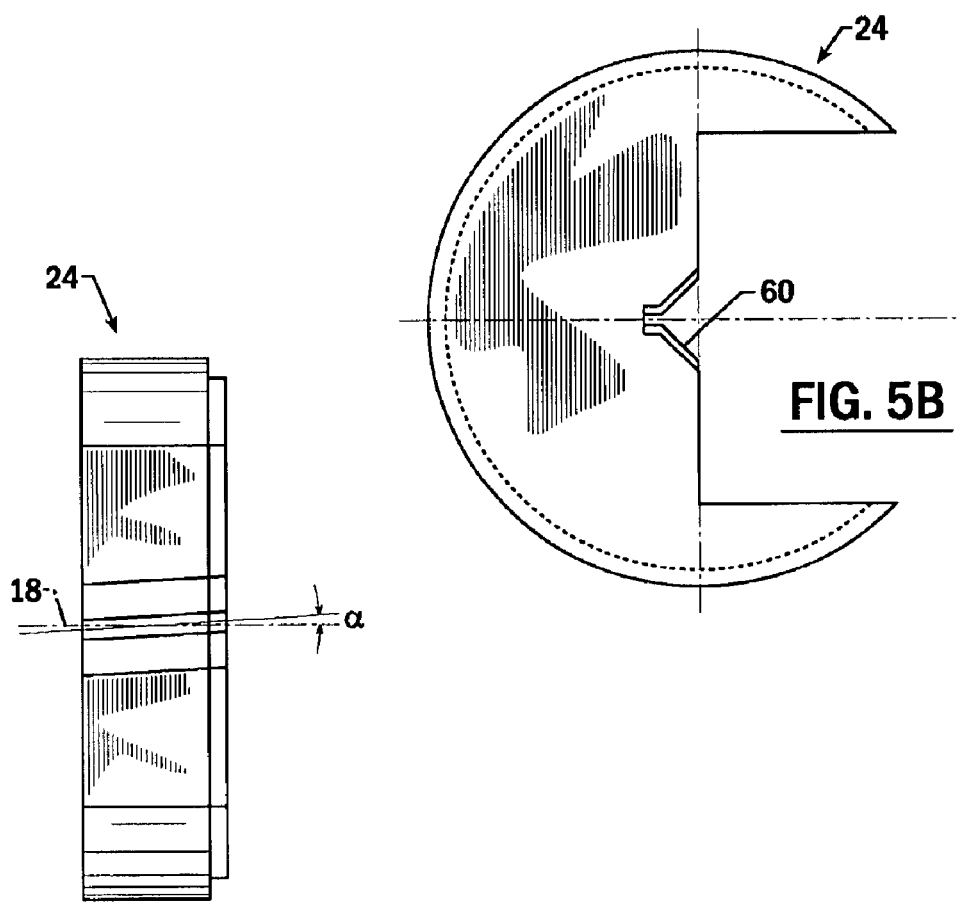
FIG. 5B
FIG. 5C

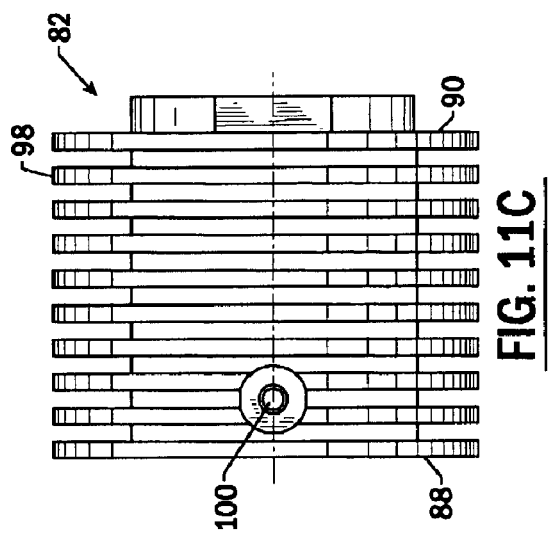
FIG. 11A
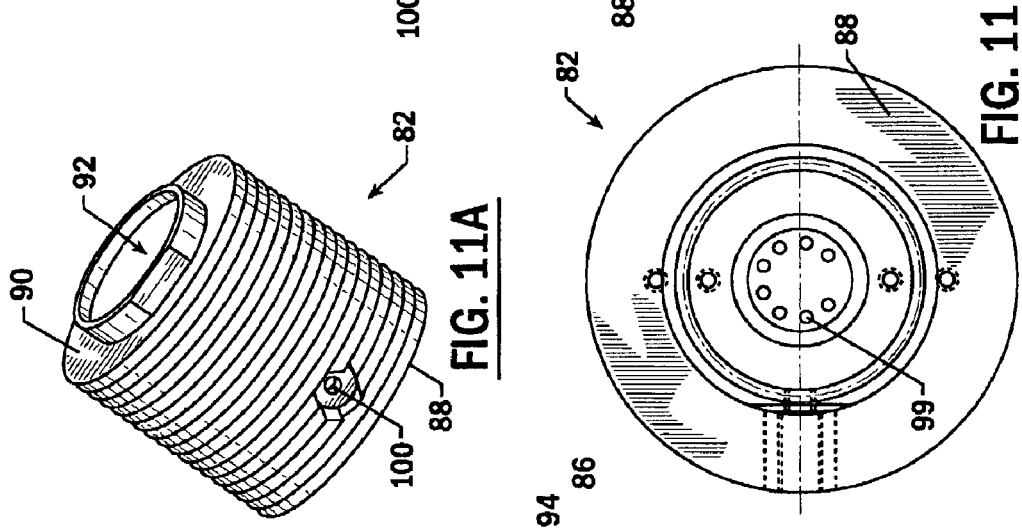
FIG. 11B
FIG. 11C
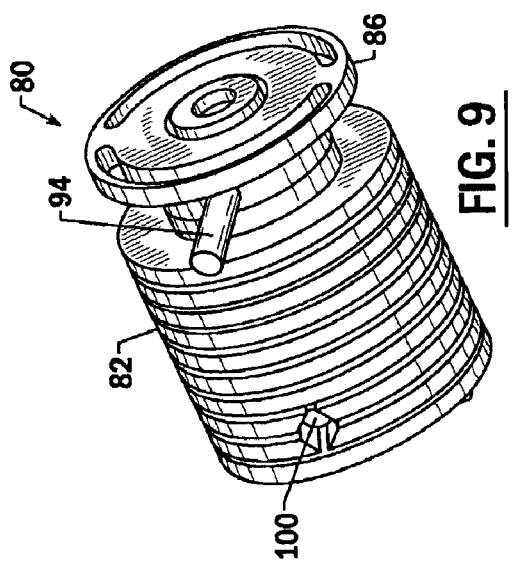
FIG. 9
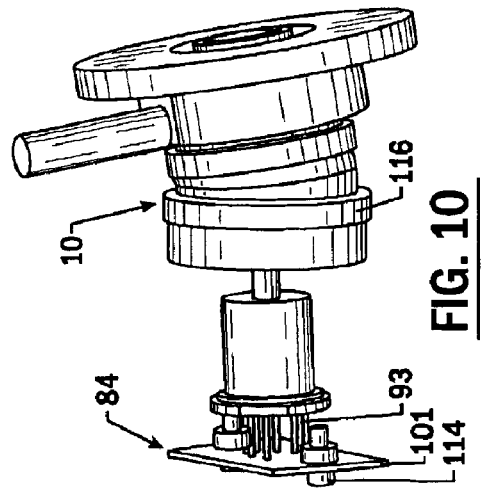
FIG. 10

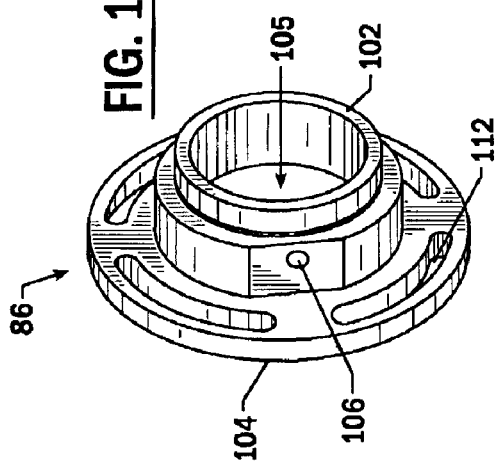
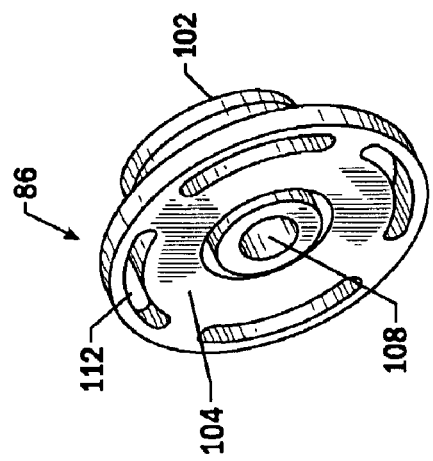
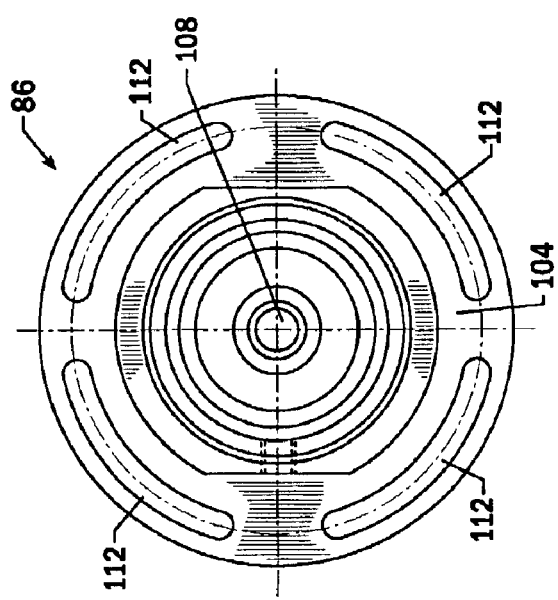

MICROLASER CAVITY ASSEMBLY AND ASSOCIATED PACKAGING METHOD

FIELD OF THE INVENTION

The present invention relates generally to an electro-optic system including a cavity assembly and associated packaging methods and, more particularly, to an electro-optic system including a laser cavity assembly and associated methods for packaging the electro-optic system.

BACKGROUND OF THE INVENTION

Electro-optic systems used in many modern applications, such as laser induced fluorescence, micro-machining and laser spectroscopy, are being further miniaturized such that many electro-optic components are commonly mounted upon the same platform. The platform typically includes an electro-optic assembly which may be mounted upon a heat sink, such as a heat pump or the like. As such, at least portions of the electro-optic assembly are generally formed of a thermally conductive material, such as a metal or semiconductor, in order to provide a path of relatively low thermal impedance from the various electro-optic components of the electro-optic assembly to the underlying heat sink.

In order to properly function, the various components of the electro-optic system must be precisely aligned. For example, an electro-optic system that includes a pump diode and an associated laser crystal or active gain medium requires that the pump diode be precisely aligned with the laser crystal as well as various other optical components, such as other electro-optic components, lenses, mirrors and the like. While this alignment has always been somewhat challenging, the alignment of the various components of an electro-optic system has become increasingly critical and increasingly difficult as the various components of the electro-optic systems have become even smaller.

Once the various electro-optic elements have been appropriately mounted upon the electro-optic assembly, the resulting assembly, including the electro-optic assembly and any underlying heat sink, is commonly mounted in an appropriate package, such as a TO-3 or TO-8 package. As is known to those skilled in the art, electro-optic packages, such as TO-3 or TO-8 packages, include a number of conductive pins which must be electrically connected to appropriate leads of the resulting assembly in order to provide the necessary electrical energy to the electro-optic system. Even if the various electro-optic components are properly mounted upon the electro-optic assembly, the mounting of the resulting assembly within the package and the establishment of the electrical connections between the conductive pins of the package and respective leads of the resulting assembly can disadvantageously affect the performance of the electro-optic system. In particular, the mounting of the resulting assembly within a package generally requires handling of the resulting assembly which may expose the resulting assembly and, more particularly, the various electro-optic components, to static electricity and other deleterious conditions. In addition, conventional packaging techniques, including the establishment of appropriate electrical connections between the conductive pins of a package and the respective leads of the resulting assembly, may disadvantageously heat the various electro-optic components.

Although a variety of miniaturized electro-optic systems have been developed which include electro-optic assemblies and associated heat sinks for providing heat dissipation for the various electro-optic components, a need still exists for improved techniques for aligning the various electro-optic components of a miniaturized electro-optic system. In this regard, devices such as gimbal assemblies are often used to radially position the various electro-optic crystal components. But due to the somewhat-free rotating motion of many conventional gimbal assemblies, the gimbal assemblies tend to undesirably rotate as small forces are applied to the various components of the assemblies, or the assemblies themselves.

Moreover, a need still exists for improved packaging techniques in order to appropriately package an electro-optic system without adversely affecting the electro-optic components. In addition, a need always exists for improved packaging techniques to appropriately package an electro-optic system while utilizing as few components as necessary. In this regard, a system having fewer components generally becomes more fault-tolerant, has less weight and can cost less than conventional electro-optic systems.

SUMMARY OF THE INVENTION

In light of the foregoing background, the present invention provides a cavity assembly that includes at least one alignment assembly for aligning respective electro-optic components of an electro-optic system. In this regard, the alignment assemblies align the electro-optic components and hold the electro-optic components in a manner that does not allow for undesirable free rotating motion, as compared to traditional gimbal assemblies. Additionally, the present invention provides an electro-optic system that includes a cavity assembly and has a housing that serves to protect the cavity assembly from the external environment and to conduct heat away from the cavity assembly. As such, the cavity assembly does not require a separate heat sink and, thus, utilizes fewer components than conventional cavity assemblies. Associated methods for packaging the electro-optic system and the cavity assembly are also provided.

According to one embodiment, a cavity assembly includes an active gain medium and at least one electro-optic component, such as a frequency doubling element (e.g., KTiOPO) and/or a fourth harmonic generator (e.g., Beta-Barium Borate crystal). Additionally, the cavity assembly includes at least one alignment assembly configured to receive the electro-optic components such that the electro-optic components are at least partially aligned with the active gain medium. The alignment assemblies are rotatably disposed relative to the active gain medium such that relative rotation of the alignment assemblies and the active gain medium alters the alignment of the electro-optic components with respect to the active gain medium.

The cavity assembly can further include a mounting member defining an aperture, where the active gain medium is disposed within the aperture defined by the mounting member. In one embodiment, the mounting member is externally threaded. Also, at least one of the alignment assemblies may be capable of being secured to the mounting member. For example, the alignment assemblies can include a first alignment assembly and a second alignment assembly, where the first alignment assembly is capable of being secured to the mounting member. The second alignment assembly is then capable of being secured to the first alignment assembly opposite the mounting member. Also by way of example, the first alignment assembly can be configured to receive a first electro-optic component, while the second alignment assembly is configured to receive a second electro-optic component that is different from the second electro-optic component. The active gain medium may be disposed in thermal contact with the mounting member such that heat generated by the active gain medium is at least partially conducted to the mounting member. In one embodiment, the cavity assembly further comprises a support assembly upon which the active gain medium is mounted, where the support assembly is capable of being secured to the mounting member at least partially within the aperture defined by the mounting member.

In one advantageous embodiment, each alignment assembly comprises a positioning member and a wedge member. The positioning member is configured to receive a respective electro-optic component such that the electro-optic component is at least partially aligned with the active gain medium. Also, the positioning member can be configured to receive the respective electro-optic component such that the electro-optic component is at an angle from an axis defined by the mounting member. The wedge member includes first and second major opposed surfaces, where the first surface is at an acute angle with respect to the second surface. The wedge member is rotatably disposed relative to the respective positioning member such that relative rotation of the wedge member and the positioning member alters the alignment of the electro-optic component with respect to the active gain medium. The positioning member and wedge member may be capable of being secured to one another, such as secured independent of the mounting member.

In one advantageous embodiment, the present invention provides a method of packaging a cavity assembly. The method generally begins by providing the mounting member and thereafter mounting the active gain medium to the mounting member. In embodiments including the support assembly, the active gain medium is mounted to the support assembly, and the support assembly is mounted within an aperture defined by the mounting member. Next, the alignment assemblies are positioned relative to the mounting member, where each alignment assembly includes an electro-optical component. The alignment assemblies are positioned by providing relative rotation between the alignment assemblies and the active gain medium to thereby alter the alignment of the respective electro-optic components with respect to the active gain medium. Then, at least one alignment assembly is secured to the mounting member.

In embodiments where the alignment assemblies each include a positioning member and wedge member, the alignment assemblies are positioned by first rotatably aligning the wedge member of each alignment assembly relative to the respective positioning member such that relative rotation of the wedge member and the respective positioning member alters the alignment of the respective electro-optic component with respect to the active gain medium. Then, the wedge member is secured to the respective positioning member.

According to another aspect of the present invention, an electro-optic system is provided. According to this aspect, the electro-optic system comprises a housing that is made of a thermally conductive material and defines an internal cavity. The housing can additionally comprise a plurality of ribs. The system includes a pump assembly and a cavity assembly. The pump assembly, in turn, includes a pump source and is mounted at least partially within the internal cavity of the housing. The cavity assembly comprises an active gain medium and at least one alignment assembly, which includes at least one electro-optic component. The alignment assemblies are disposed relative to the active gain medium such that the electro-optic components are at least partially aligned with the active gain medium. Additionally, the cavity assembly is disposed within the internal cavity of the housing such that the cavity assembly is in thermal contact with the housing to thereby permit heat transfer from the active gain medium. To at least partially protect the cavity assembly from degradation, the internal cavity of the housing can be is isolated from an external environment.

According to yet another aspect of the present invention, a method of packaging an electro-optic system is provided. The method generally begins by providing the housing. The pump assembly, including a pump source, is then mounted at least partially within the internal cavity of the housing. Next, the cavity assembly is secured within the internal cavity defined by the housing. In this regard, securing the cavity assembly within the internal cavity includes establishing thermal contact between the cavity assembly and the housing to thereby permit heat transfer from the active gain medium to the housing. Then, the internal cavity is closed to thereby isolate the internal cavity from the external environment so as to at least partially protect the cavity assembly from degradation. In embodiments where the alignment assembly includes the mounting member, before securing the cavity assembly within the internal cavity, the active gain medium is fixed in position with respect to the mounting member. The alignment assemblies are then rotated relative to the mounting member to thereby alter the alignment of the respective electro-optic components with respect to the active gain medium. Next, the alignment assemblies are secured to the mounting member. Also, the mounting member of the cavity assembly can be secured within the internal cavity defined by the housing, such as by threadably securing the mounting member.

Therefore, the present invention provides a cavity assembly that includes at least one alignment assembly for aligning respective electro-optic components of an electro-optic system, and for holding the electro-optic components in a manner that does not allow for undesirable free rotating motion. Additionally, the present invention provides an electro-optic system that includes the cavity assembly and has a housing that serves to protect the cavity assembly from the external environment and to conduct heat away from the cavity assembly, thus not requiring an independent heat sink.

BRIEF DESCRIPTION OF THE DRAWINGS

Figure 1:
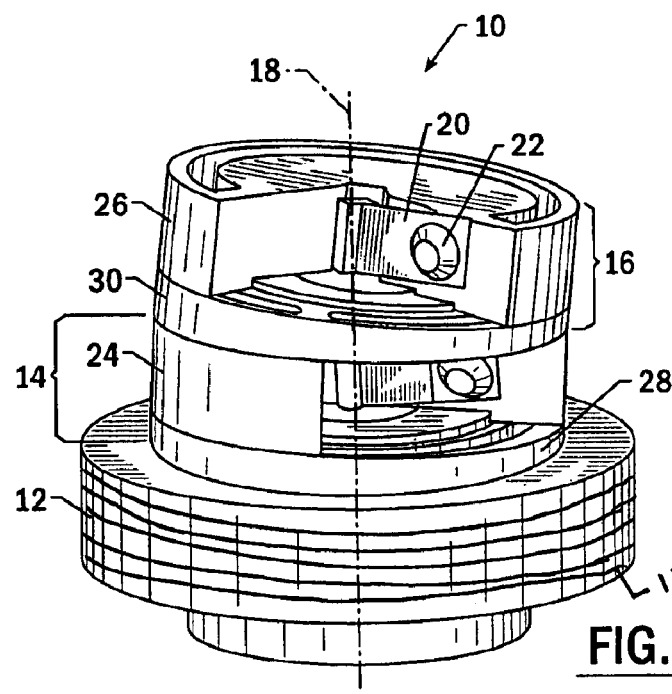
Figure 2A:
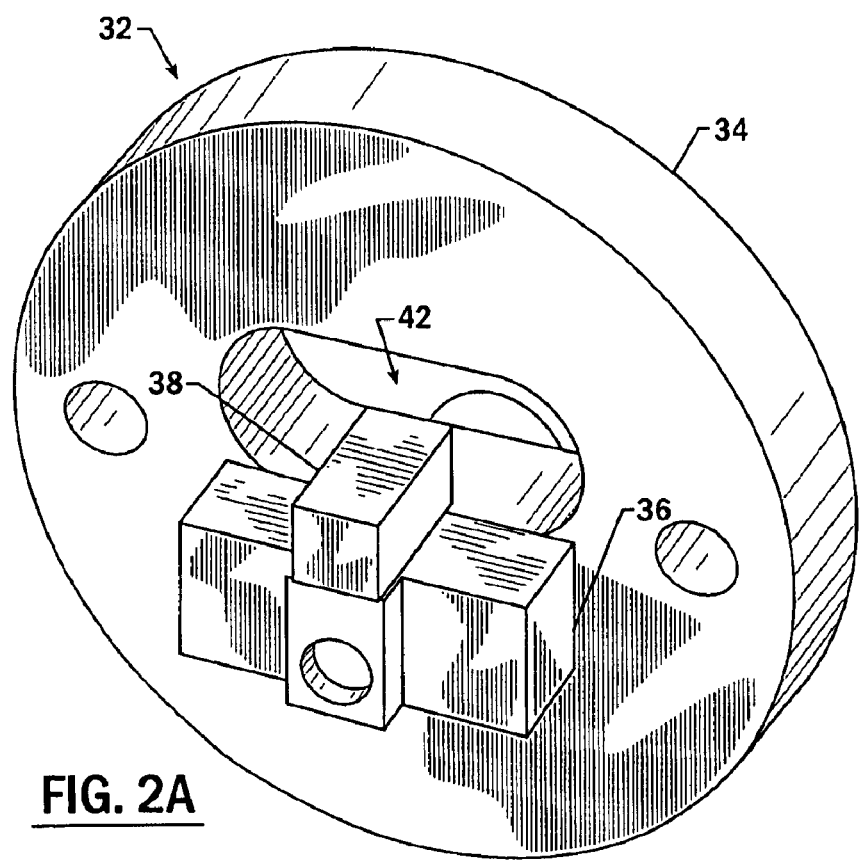
Figure 2B:
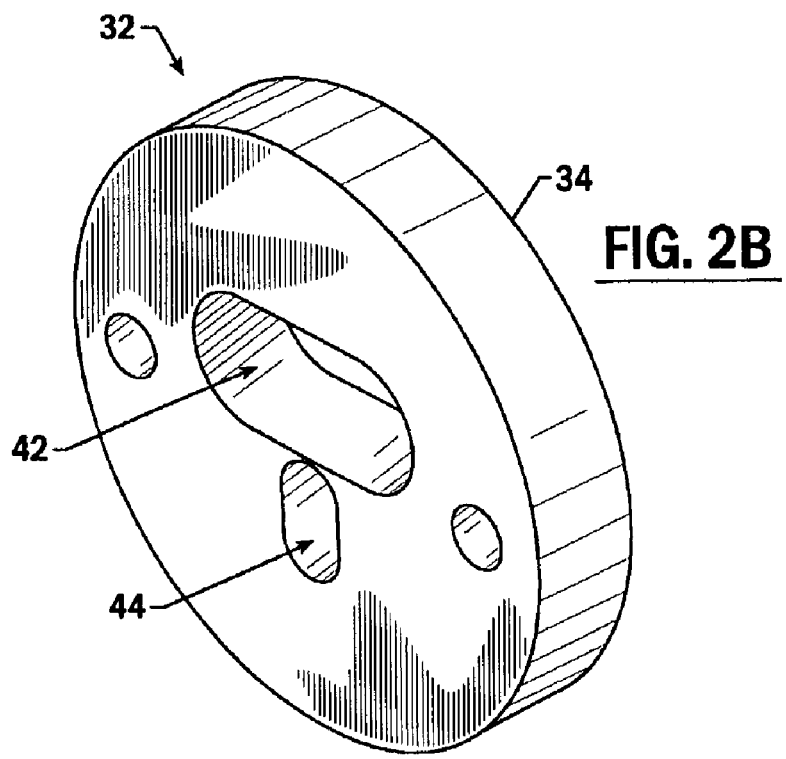
Figure 2C:
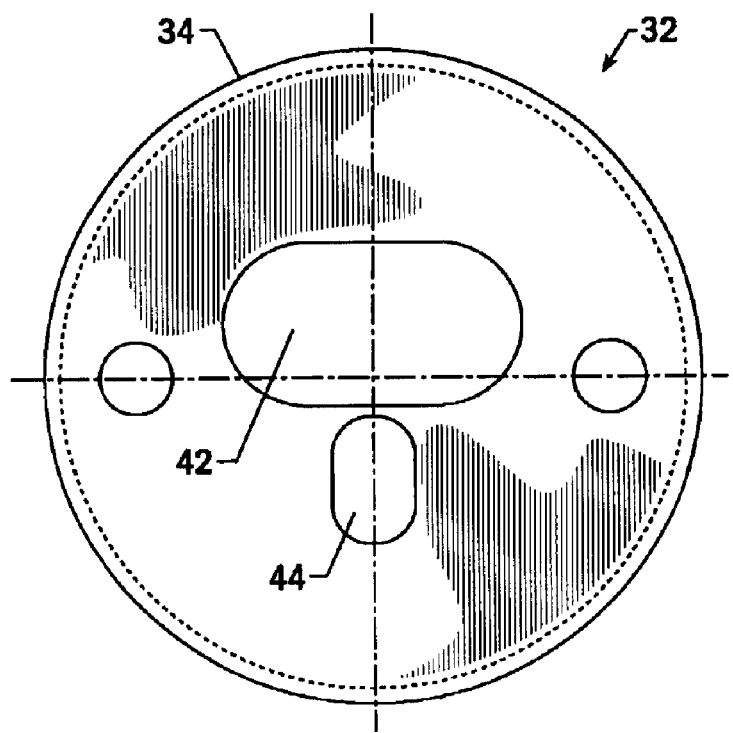
Figure 3A:
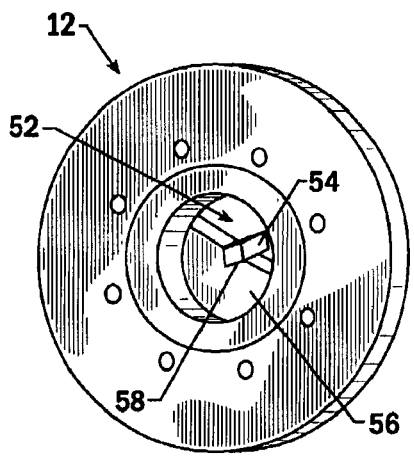
Figure 3B:
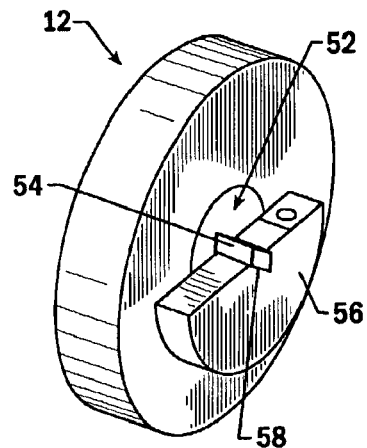
Figure 4A:
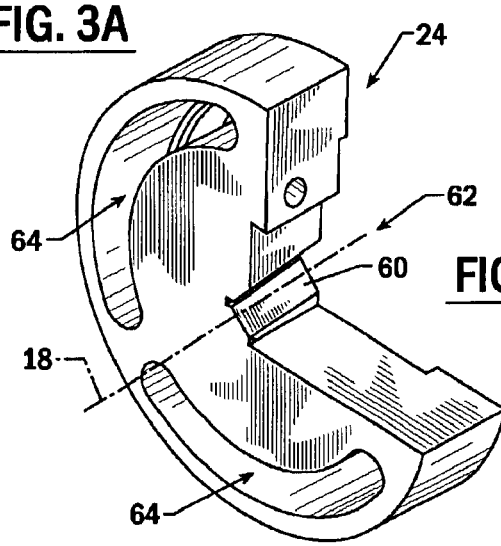
Figure 4B:
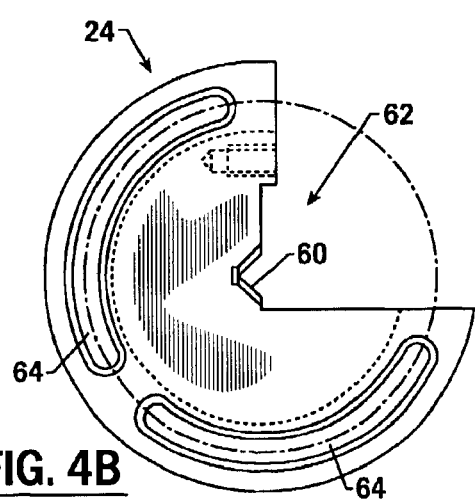
Figure 4C:
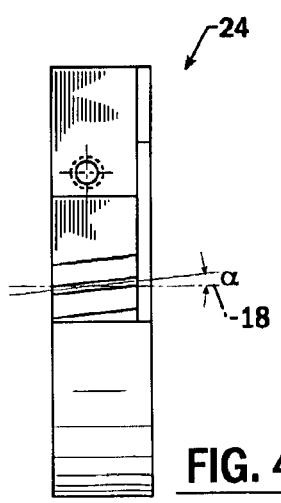
Figure 6A:
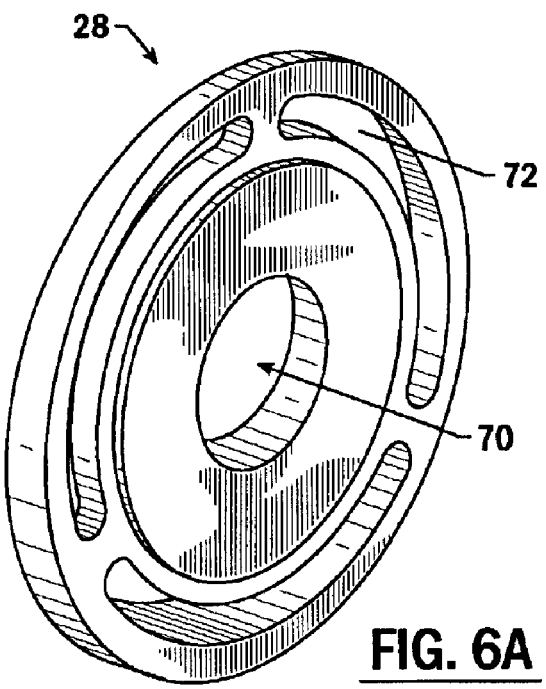
Figure 6B:
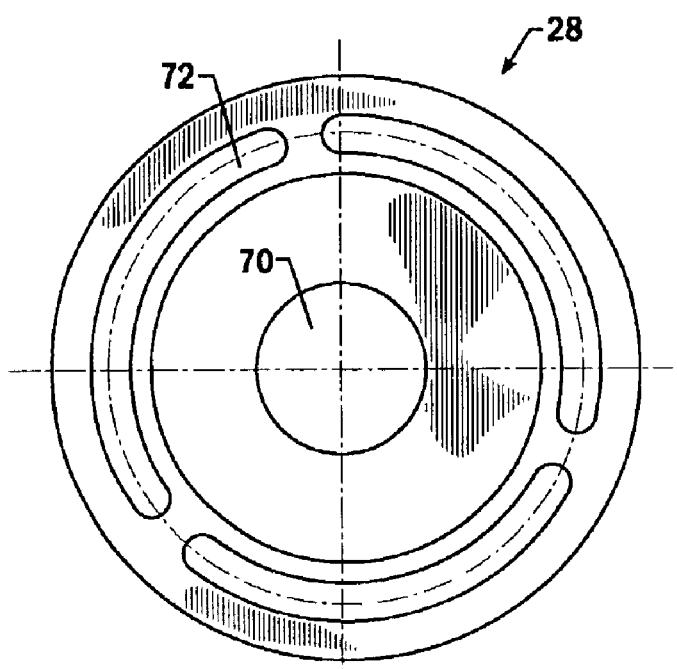
Figure 6C:
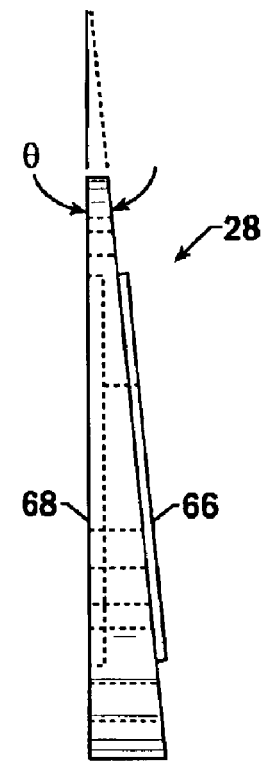
Figure 7A:
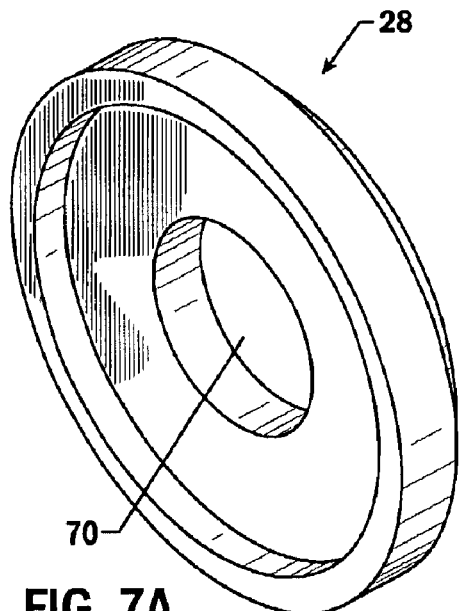
Figure 7B:
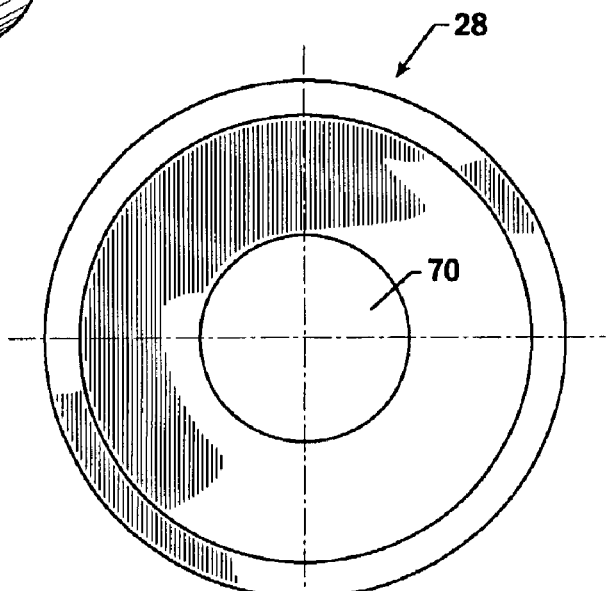
Figure 7C:
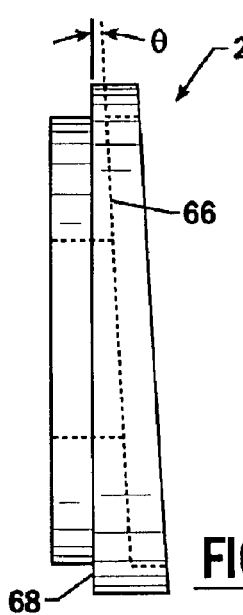
Figure 8:
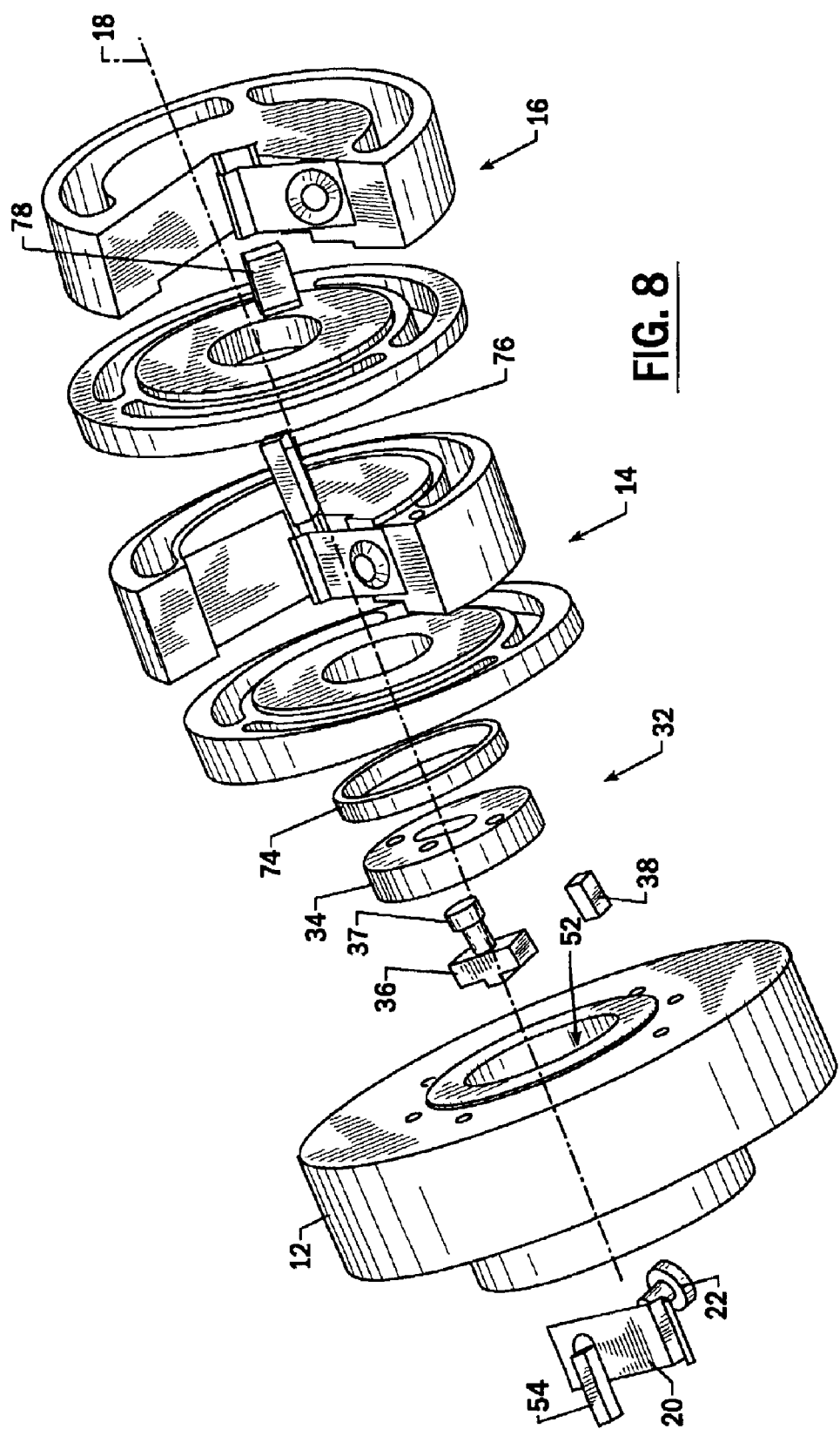
Figure 13:
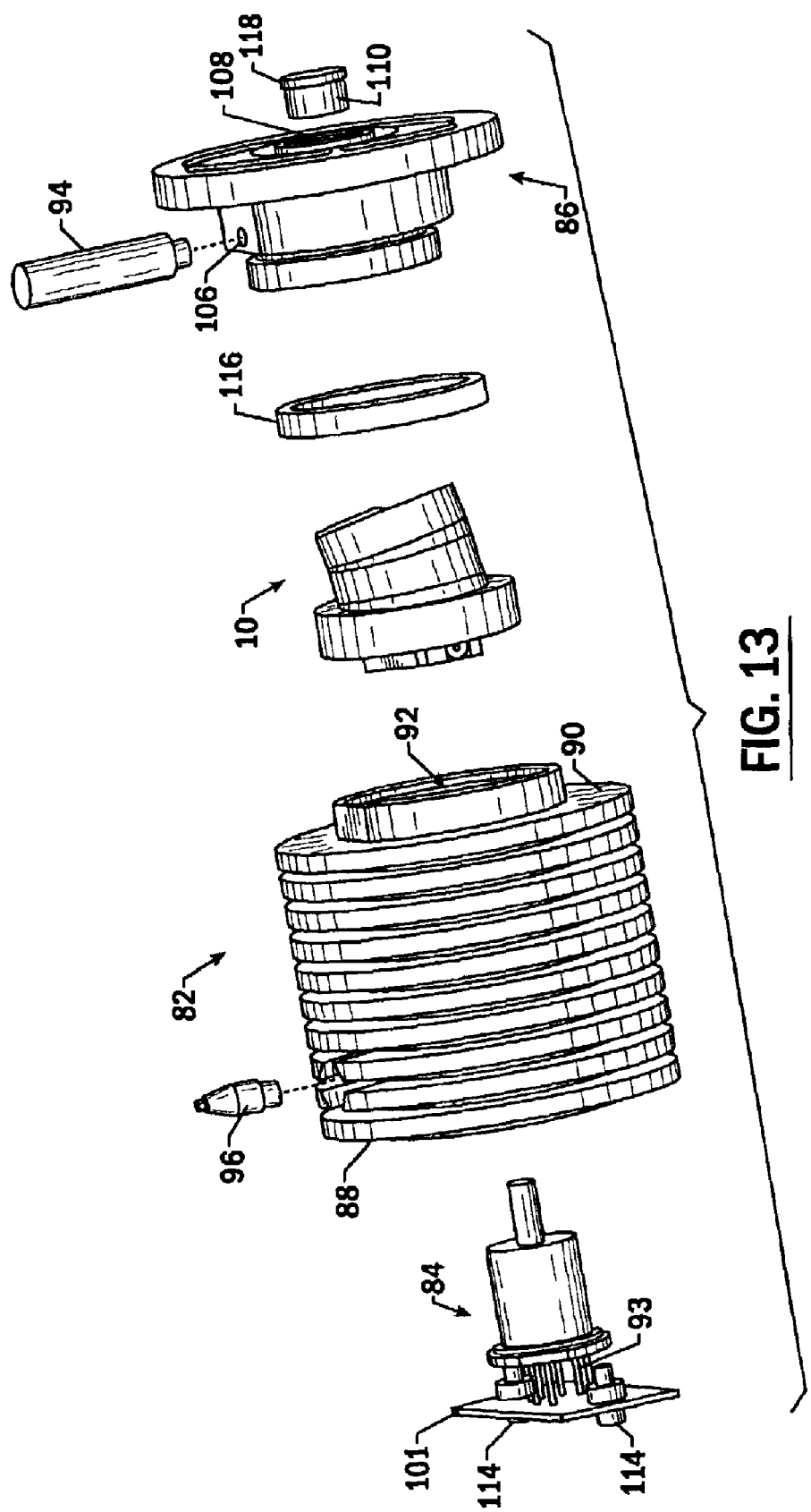
Figure 14A:
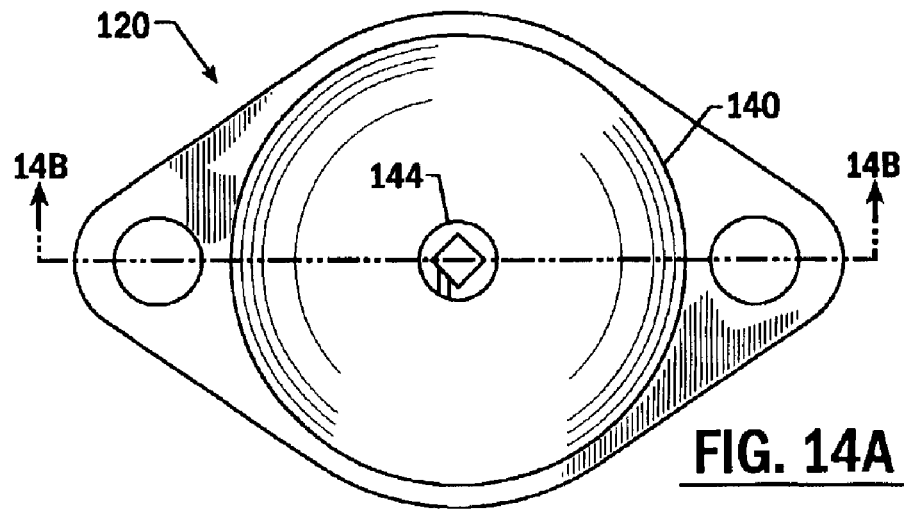
Figure 14B:
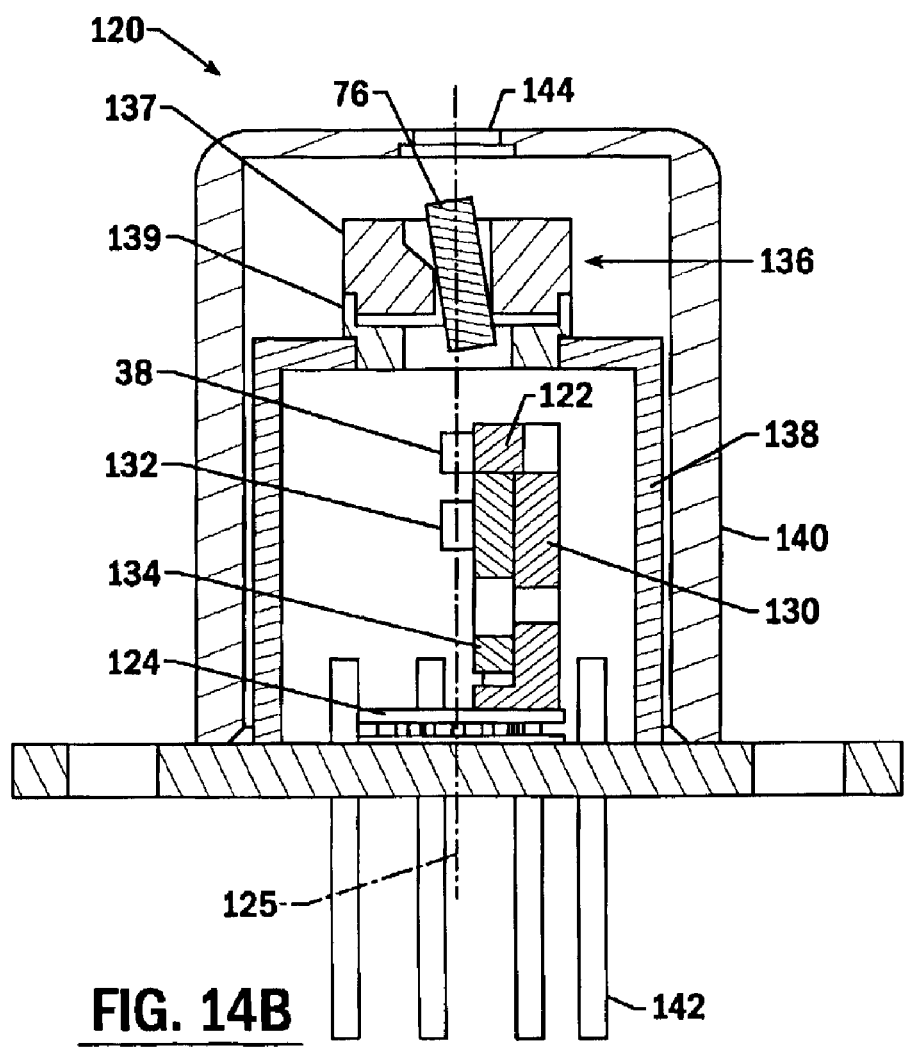

Having thus described the invention in general terms, reference will now be made to the accompanying drawings, which are not necessarily drawn to scale, and wherein:

FIG. 1 is a perspective view of a cavity assembly according to one embodiment of the present invention;

FIGS. 2A–2C are various perspective views and a front view, respectively, of a support assembly according to one embodiment of the present invention;

FIGS. 3A–3B are perspective views of a mounting member according to one embodiment of the present invention;

FIGS. 4A–4C are various views of a positioning member according to one embodiment of the present invention;

FIGS. 5A–5C are various views of a positioning member according to another embodiment of the present invention;

FIGS. 6A–6C are various views of a wedge member according to one embodiment of the present invention;

FIGS. 7A–7C are various views of a wedge member according to another embodiment of the present invention;

FIG. 8 is an exploded perspective view illustrating the elements of the cavity assembly according to one embodiment of the present invention;

FIG. 9 is a perspective view of an electro-optic system according to one embodiment of the present invention;

FIG. 10 is an exploded perspective view of the electro-optic system illustrated in FIG. 9 with the housing removed;

FIGS. 11A–11C are various views of a housing according to one embodiment of the present invention;

FIGS. 12A–12C illustrate various views of an end member according to one embodiment of the present invention;

FIG. 13 is an exploded perspective view illustrating the elements of the electro-optic system according to one embodiment of the present invention; and FIGS. 14A–14B are a top view and a cross-section view, respectively, of an electro-optic system according to another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, the cavity assembly 10 according to one embodiment of the present invention is illustrated. Although the cavity assembly can support any of a variety of electro-optic systems, the cavity assembly is particularly advantageous for supporting and aligning a microlaser system which requires precise alignment between a pump source (e.g., laser diode), a laser crystal or other active gain medium (hereinafter generally termed a microresonator cavity), and various other electro-optic components. As such, the cavity assembly will be hereinafter described in conjunction with a microlaser system. As illustrated, the cavity assembly includes a mounting member 12 that defines an optical axis 18, which can be in any number of positions but, in a preferred embodiment, extends through the center of the mounting member.

Referring now to FIG. 2A, the cavity assembly 10 further includes a support assembly 32, which includes a securing member 34 and a heat sink platform 36 to secure and align a microresonator cavity 38 with the pump source as described below. Since the pump source is typically aligned along the optical axis 18 of the mounting member 12, the microresonator cavity is also typically aligned along the optical axis of the mounting member. To allow heat to be transferred from the microresonator cavity, the securing member is preferably made of a thermally conductive material, such as aluminum. Similarly, the heat sink platform is preferably made of a thermally conductive material, such as copper. In this regard, the microresonator cavity is secured to the heat sink platform, and the heat sink platform is secured to the securing member. It should be understood by those having skill in the art that an element or component that is described as being "on," "mounted upon" or "secured to" another element may be either mounted or secured directly on the underlying element or may merely overlie the other element with one or more intervening layers or elements being disposed between the elements. Each component of the support assembly can be secured in any one of a number of different manners but, in one embodiment, the microresonator cavity is soldered to the heat sink platform, and the heat sink platform is secured to the securing member via a screw 37, pin, or the like (hereinafter generally referred to as a screw). As described below, the securing member is capable of being mounted within the mounting member and, as such, includes external threads in one embodiment for threadably engaging corresponding internal threads of the mounting member.

The securing member 34, according to one embodiment, defines an opening 42 and a microresonator adjustment aperture 44, as shown in FIGS. 2B and 2C. When the heat sink platform 36, including the microresonator cavity 38, is secured to the securing member, the microresonator cavity is at least partially aligned with the opening 42. The adjustment aperture allows alignment of the microresonator cavity with respect to the opening 42 to be adjusted. In this regard, in a preferred embodiment, the adjustment aperture is an elongated, radially extending opening through which the screw extends. The screw also engages the heat sink platform and initially makes a relatively loose connection such that the heat sink platform and the microresonator cavity carried by the heat sink platform can be adjusted relative to the securing member within the bounds defined by the adjustment aperture. Once the microresonator cavity is properly positioned as described below, the screw may be tightened to fix the position of the heat sink platform and the microresonator cavity relative to the securing member.

The microresonator cavity 38 preferably includes an active gain medium and a saturable absorber sandwiched between a pair of mirrors that define the resonant cavity. In this regard, examples of suitable microresonator cavities are described by U.S. Pat. No. 5,394,413 to John J. Zayhowski which issued on Feb. 28, 1995, and U.S. Pat. No. 6,072,815 to Brian L. Peterson which issued on Jun. 6, 2000, the contents of which are incorporated in their entirety herein. According to one advantageous embodiment, the microresonator cavity includes an active gain medium formed of neodymium-doped yttrium aluminum garnet (YAG) and the saturable absorber formed of tetravalent chrome-doped YAG. Although the active gain medium of one advantageous embodiment is doped with approximately 1.6 atomic percent of neodymium, the active gain medium and the saturable absorber can include different dopant percentages without departing from the spirit and scope of the present invention. The microresonator cavity of this embodiment will emit linearly polarized laser pulses having a wavelength of 1.06 microns. As will be apparent to those skilled in the art, however, the active gain medium and the saturable absorber can be constructed of different materials in order to provide laser outputs having different properties, such as different wavelengths.

Referring now to FIGS. 3A–3B, the support assembly 32 is capable of being mounted within the mounting member 12 such that the support assembly and mounting member are in thermal contact to thereby conduct heat away from the support assembly and, in turn, from the microresonator cavity 38. To mount the support assembly and allow for the propagation of laser pulses through the mounting member, the mounting member preferably defines an aperture 52 therethrough. And in embodiments where the securing member 34 is externally threaded, the aperture of the mounting member is preferably internally threaded to thereby threadably engage and secure the support assembly within the aperture.

To focus pump light into the microresonator cavity 38 from the pump source (described below), a light focusing device 54, such as a gradient index (GRIN) lens or other type of lens, can be secured to the mounting member 12 near or within the aperture 52, as shown in FIG. 8. To support the light focusing device, the mounting member can include a platform portion 56 disposed on one surface of the mounting member. The platform portion generally defines a recess 58, disposed proximate the optical axis of the mounting member and configured to receive the light focusing device.

The light focusing device 54 can be secured in the recess 58 in any one of a number of manners but, in one embodiment, the light focusing device is secured by a fastening assembly, including a flat spring 20, and a screw 22 to secure the flat spring to the mounting member 12. In this regard, the light focusing device can be positioned in the recess between the platform portion and the flat spring, and thereafter secured to the platform portion by tightening the screw. Once secured, the light focusing device generally lies along the optical axis defined by the mounting member. The mounting member, including the platform portion, is formed of a thermally conductive material, such as aluminum. And as such, the mounting member can at least partially transfer heat generated by the active gain medium 38 and conducted by the support assembly 32, to a housing as described below.

The cavity assembly 10 also includes an alignment assembly secured to the mounting member. The cavity assembly can also include one or more additional alignment assemblies, with each alignment assembly capable of being secured to an adjacent alignment assembly. For example, and again referring to FIG. 1, the cavity assembly can include a first alignment assembly 14 capable of being secured to the mounting member, and a second alignment assembly 16 capable of being secured to the first alignment assembly. Each alignment assembly is capable of receiving an electro-optic component. For example, one or more alignment assemblies may receive a frequency doubling crystal, typically formed of KTiOPO, or KTP. Additionally, or alternatively, one or more alignment assemblies may receive a fourth harmonic generator, typically formed of Beta-Barium Borate crystal, or BBO, in order to generate a fourth order output.

To secure the electro-optic component to the respective alignment assembly 14, 16, various techniques may be utilized. For example, the electro-optic component may be secured to the respective alignment assembly by means of solder, an epoxy resin or other bonding agent. Alternatively, the alignment assembly can include a fastening assembly. The fastening assembly can comprise any of a number of elements but, in a preferred embodiment, generally comprises a flat spring 20, such as a stainless-steel spring, secured to the mounting member, such as by a screw 22. In this regard, the electro-optic component can be positioned adjacent the respective alignment assembly between the respective alignment assembly and the flat spring, and thereafter secured to the respective alignment assembly by tightening the screw. To further secure the electro-optic component the flat spring and/or the respective alignment assembly can define a groove for receiving the electro-optic component, as described below. In this regard, the electro-optic component can be secured and experience thermal expansion and contraction without alignment of the electro-optic component being displaced.

The alignment assemblies are capable of rotating about the optical axis 18 of the mounting member 12 to thereby align the transmission axes of respective electro-optic components in parallel with the polarization of the laser pulses emitted by the microresonator cavity 38. As such, degradation in the intensity of the polarized laser pulses that is introduced by the respective electro-optic components due to angular differences between the polarized laser pulses and the transmission axes of the electro-optic components may be minimized.

Since the microresonator cavity 38 generally lies along the optical axis 18 of the mounting member 12 such that the laser pulses are polarized in a direction parallel to the optical axis, the lattice structure of the electro-optic crystals, which defines the transmission axis of the respective electro-optic components, is preferably aligned with the optical axis. In this regard, the electro-optic crystals include a lattice structure grown along a predetermined plane. The crystals are then cut along the predetermined plane and aligned with the optical axis of the microresonator cavity. Due to variances in the growth and/or cutting of the electro-optic crystals, however, many electro-optic crystals experience a tilt of the lattice structure from the plane along which the crystal is cut. This off-axis tilt, if not accounted for, can cause the electro-optic crystals to degrade the laser pulses. As such, each alignment assembly 14, 16 can include a positioning member 24, 26 upon which the electro-optic component is mounted, and a wedge member 28, 30.

To account for the off-axis tilt of the electro-optic components, the wedge member 28, 30 of each alignment assembly 14, 16 is capable of being rotated about an axis, such as the optical axis 18 of the mounting member 12, to thereby position the respective positioning member 24, 26 and, in turn, the electro-optic component carried by the positioning member, at a predefined angle with respect to the mounting member. In this regard, the positioning member can be positioned such that the lattice structure of the respective electro-optic component is aligned properly with the polarization direction of the laser pulses, such as by being aligned along the optical axis when the alignment assembly is secured to the mounting member. In order to increase the angular range through which the electro-optic component can be tilted, as described below, the positioning member can receive the respective electro-optic component at an angle relative to the optical axis such that the transmission axis of the electro-optic component is at an angle thereto.

Referring now to FIGS. 4–5 and 6–7, respectively, embodiments of the positioning member 24 and wedge member 28 of the first alignment assembly 14 are illustrated. As shown in FIGS. 4A–4C, the positioning member can comprise any of a number of different materials but is preferably thermally conductive and, in one embodiment, comprises stainless steel. The positioning member is generally adapted to receive a respective electro-optic component. Thus, the positioning member defines a receptacle 60. Since the microresonator cavity 38 is preferably mounted along the optical axis 18 of the mounting member 12, the positioning member preferably defines the receptacle such that the optical axis at least partially extends therethrough when the alignment assembly is secured to the mounting member.

In the illustrated embodiment, for example, the positioning member 24 can be generally cylindrical and can have a C-shape as a result of a wedge-shaped void 62. Within the void, the positioning member defines the receptacle 60 such that the optical axis 18 of the mounting member 12 extends therethrough. Although the illustrated positioning member has a C-shape, it should be understood that the positioning member need not be C-shaped, but merely must be capable of carrying the respective electro-optic component and be rotatable. For example, the positioning member may be cylindrical with a hole therethrough for receiving the electro-optic component. Also, as shown in FIGS. 5A–5C, the positioning member can be generally cylindrical and define a rectangular void, within which the receptacle is defined. To secure the electro-optic component to the positioning member, the positioning member can additionally include a fastening assembly. As stated above, the fastening assembly may include a flat spring 20, which overlies the electro-optic component, and a screw 22 or other connector for attaching the flat spring to the positioning member (see FIG. 1). The fastening assembly is advantageous since the fastening assembly allows the electro-optic component to be secured within the receptacle of the positioning member and experience thermal expansion and contraction without being displaced from alignment with the optical axis. Although the electro-optic component is preferably secured to the positioning member by means of the fastening assembly, it should be understood that the electro-optic component can be secured to the positioning member according to any one of a number of different methods without departing from the spirit and scope of the present invention.

As previously stated, the alignment assemblies 14, 16 are capable of being rotated about the optical axis 18 of the mounting member 12 to thereby align the transmission axis of respective electro-optic components with respect to the polarization of the laser pulses emitted by the microresonator cavity 38. Therefore, the positioning member 24 of the embodiment illustrated in FIGS. 4A–4C defines at least one and, more typically, a plurality of curved openings 64 for receiving at least one securing element such as a screw, pin or the like. In this regard, the positioning member can rotate while the securing element extends through a respective curved opening so long as the securing element has not fixedly secured the positioning member to the mounting member, as described below.

Further, to increase the angular range through which the electro-optic component may be oriented, the positioning member 24 can receive the respective electro-optic component at an angle. In this regard, the receptacle 60 defined by the positioning member for receiving the respective electro-optic component can be situated at a predefined angle α with respect to the axis defined by the cylindrically shaped positioning member. Whereas the predefined angle can substantially vary, in one embodiment the predefined angle is no greater than the angle defined by the respective wedge member 28, such as five degrees.

Referring now to FIGS. 6A–6C, the wedge member 28 of one embodiment of the alignment assembly 14 includes first 66 and second 68 major opposed surfaces, with the first surface of the wedge member at an acute angle θ, such as five degrees, with respect to the second surface. Similar to the positioning member 24, the wedge member can comprise any one of a number of different materials but, in one embodiment, is thermally conductive, such as stainless steel. To allow for the propagation of laser pulses through the wedge member, the wedge member defines an aperture 70 through which the laser pulses emitted by the microresonator cavity 38 propagate. As a result of the alignment of the microresonator cavity along the optical axis 18 of the mounting member 12, the optical axis also generally extends through the aperture defined by the wedge member when the alignment assembly is mounted to the mounting member. For another embodiment of the wedge member of the alignment assembly, see FIGS. 7A–7C.

The wedge member 28 can be positioned in any one of a number of different manners relative to the respective positioning member 24. But in a preferred embodiment, the wedge member is positioned next to the respective positioning member and centered thereon by means of a male portion of either the wedge member or the positioning member, and a corresponding female portion defined by the other member. The wedge member can be secured relative to the respective positioning member in any of a number of different manners but, in one embodiment, securing elements can be extended at least partially through the wedge member and respective positioning member. In this embodiment, the wedge member defines at least one and, more typically, a plurality of curved openings 72 (shown in the embodiment of FIGS. 6A–6C), similar to those of the positioning member, for receiving respective securing elements. Thus, the wedge member and/or the positioning member can rotate while the securing elements extend through the respective curved openings so long as the securing elements have not fixedly secured the respective wedge member and/or positioning member to the mounting member 12. Since the wedge member is angled, relative rotation between the wedge member and the respective positioning member serves to alter the angle of the transmission axis of the respective electro-optic component to the polarization direction of the laser pulses emitted by the microresonator cavity 38. Once properly aligned, the wedge member can be secured relative to the respective positioning member, such as by engaging one or more securing elements with both the wedge member and respective positioning member and thereafter tightening the securing elements.

The present invention also provides an advantageous method for packaging a cavity assembly 10 including at least one alignment assembly, which will now be described in conjunction with the embodiment of the cavity assembly illustrated in FIG. 8. According to this aspect of the present invention, the support assembly 32 is initially mounted at least partially, but preferably entirely, within the aperture 52 of the mounting member 12, such as by threadably advancing the support assembly within the aperture.

To hold the support assembly in place, a retaining member 74 may be mounted within the aperture of the mounting member proximate the support assembly. The microresonator cavity 38 of the support assembly is then at least partially aligned with the optical axis 18 of the mounting member.

To most efficiently transfer the heat generated by the microresonator cavity 38, the microresonator cavity is aligned with the pump source, typically along the optical axis 18 of the mounting member 12, such that pump light is focused into the microresonator cavity at a point as close as possible to the plane of contact between the microresonator cavity and the heat sink platform 36 without causing the heat sink platform to clip any of the pump light. As such, to align the support assembly 32 with the optical axis according to one advantageous embodiment, an initial alignment is determined and light is pumped into the microresonator cavity. Typically, the initial alignment provides for the pump source to pump the microresonator cavity approximately in the center of an end face of the microresonator cavity. After loosening the screw 37 securing the heat sink platform to the securing member 34, the heat sink platform and the microresonator cavity are adjusted radially relative to the securing member such that the pump light is focused at a point on the microresonator cavity closer to the heat sink platform. And then the laser output is monitored. Adjustment of the microresonator cavity is then repeated while monitoring the laser output until a laser output begins to degrade, which is due to the pump light at least partially being clipped by the heat sink platform. The radial movement of the heat sink platform is then reversed until the laser output is no longer degraded. At this point, the screw securing the heat sink platform to the securing member is tightened to secure the position of the heat sink platform and the microresonator cavity relative to the securing member.

Once the support assembly 32 has been mounted to the mounting member 12 and aligned with the optical axis 18 of the mounting member, the alignment assemblies are then aligned relative to the mounting member. According to a preferred embodiment, the first alignment assembly is secured to the mounting member. In this regard, the first alignment assembly is secured proximate a side of the mounting member opposite the light focusing device 54, i.e., on the side through which the laser pulses are emitted. To secure each alignment assembly, each positioning member is first aligned with respect to a respective wedge member.

As previously stated, due to variances in the growth and/or cutting of electro-optic crystals, many electro-optic crystals have an off-axis tilt. As such, to avoid degradation of the laser output from the microresonator cavity 38, the off-axis tilt must be accounted for by tilting the electro-optic component relative to the optical axis 18 of the mounting member 12 such that the lattice structure of the electro-optic component aligns with the polarization of the laser pulses emitted by the microresonator cavity. To align the lattice structure, according to one exemplar method, the wedge member 28 and positioning member 24 of the first alignment assembly 14 can be temporarily secured to the mounting member, such as by inserting securing elements through the curved openings 64 and 72 of the positioning member and wedge member. The securing elements are not tightened, however, such that the wedge member is capable of rotating about the optical axis of the mounting member.

Once the wedge member 28 and respective positioning member 24 have been temporarily secured to the mounting member 12, pump light can be focused into the microresonator cavity 38 to produce laser pulses that pass through the electro-optic component carried by the positioning member. The wedge member can then be rotated about the optical axis 18 of the mounting member relative to the positioning member, which is either held in position or is rotated differently than the wedge member. As a result of the angled configuration of the wedge member, rotation of the wedge member alters the angle of the electro-optic component and, thus, the lattice structure, with respect to the laser output. The wedge member is repeatedly rotated while monitoring the output provided by the electro-optic component until the lattice structure of the electro-optic component aligns with the optical axis. This alignment can be seen as a peak in the intensity of the output from the electro-optic component. As previously stated, in a preferred embodiment, the electro-optic component can be secured to the positioning member at an angle of five degrees, and the surfaces of the wedge member can define an acute angle of five degrees. Therefore, by rotating the wedge member with respect to the optical axis, the first alignment assembly 14 can accommodate an off-axis tilt from zero to ten degrees. Once the wedge member is rotated into the desired position with respect to the positioning member, the wedge member is secured to the positioning member, such as by tightening the securing elements.

After the wedge member 28 has been secured to the positioning member 24, the overall first alignment assembly 14, i.e., the combination of the wedge member and respective positioning member, can be rotated into position with respect to the optical axis 18 of the mounting member 12. As previously stated, rotating the alignment assembly about the optical axis aligns the transmission axis of the electro-optic component in parallel with the polarization of the laser pulses emitted by the microresonator cavity 38 located upstream of the electro-optic component. And as also previously stated, the microresonator cavity of one embodiment emits linearly polarized laser pulses. Therefore, to position the alignment assembly according to one embodiment, similarly to the previous method of aligning the wedge member to the positioning member, pump light can be focused into the microresonator cavity such that the laser pulses of the microresonator cavity illuminate the electro-optic component carried by the positioning member. The alignment assembly can then be continuously rotated about the optical axis until the transmission axis of the electro-optic component is more closely aligned in parallel with the polarization of the laser pulses output by the microresonator cavity, which can also be seen as a peak in the intensity of the output from the electro-optic component. As is apparent due to the linear polarization of the output pulses, two points will exist on the electro-optic crystal, 180° apart, where the transmission axis will be aligned in parallel with the polarization of the laser pulses emitted by the microresonator cavity. Thus, the alignment assembly is rotated so as to be in one of these two positions.

Once the first alignment assembly 14 has been rotated into position, the first alignment assembly can be secured to the mounting member 12, such as by screws, pins or the like. In the embodiment which utilizes screws to secure the alignment assembly to the mounting member, the screws preferably include heads that reside in recessed portions of the positioning member of the first alignment assembly so as to not extend beyond a plane defined by a surface of the positioning member opposite the mounting member. Following securing the alignment assembly to the mounting member, one or more additional alignment assemblies can be aligned relative to the mounting member, in the same manner described above. In this regard, each additional alignment assembly will preferably be positioned on the downstream side of a previous alignment assembly opposite the mounting member and thereafter secured to the previous alignment assembly. As such, a chain of electro-optic components can be positioned downstream from the microresonator cavity 38 to further process the laser pulses output from the microresonator cavity. And by providing recessed portions of the positioning member for receiving the heads of the screws, the additional alignment assemblies can be positioned flush with the previous positioning member.

For example, the first alignment assembly 14 can include a frequency doubling crystal 76, such as a crystal formed of KTP. And in turn, the second alignment assembly 16 can include a fourth harmonic generator 78, typically formed of BBO, disposed downstream of the frequency doubling crystal in order to generate a fourth order output. Accordingly, for a cavity assembly 10 which includes a microresonator cavity 38 having an active gain medium formed of neodymium-doped YAG and a saturable absorber formed of tetravalent chrome-doped YAG which emits laser pulses having a wavelength of 1.06 micron, the cavity assembly illustrated in FIG. 8 will produce linearly polarized pulses having a wavelength of 266 nanometers.

As shown in FIGS. 9 and 10, a cavity assembly such as that described above can be employed in an electro-optic system 80. Such an electro-optic system can be utilized in many applications, including laser induced fluorescence, micromachinging and laser spectroscopy, and will now be described with reference to FIGS. 9 and 10. The electro-optic system includes the cavity assembly 10, a housing 82 and a pump assembly 84 and, in a preferred embodiment, further includes an end member 86. The housing has opposed first 88 and second 90 ends, and defines an internal cavity 92 (as shown in FIG. 11A). The pump assembly can include any one of a number of devices, but preferably includes a pump source (not shown), such as a laser diode, and an optical alignment device, such as a fast-axis collimation lens (not shown). The pump assembly may also include additional lenses, such as one or more ball or GRIN lenses, as well as an optical fiber for permitting the output of the pump source to be fiber coupled to the microresonator cavity.

Although the pump source can comprise a variety of different devices, the laser diode of one advantageous embodiment is formed of gallium arsenide and provides approximately 1.5 watts of pump power. The pump assembly 84 may be packaged within a canister or the like and may include a plurality of conductive pins 93 extending outwardly therefrom that make electrical contact with the pump source. The electro-optic system 80 therefore can be operated by driving the conductive pins of the pump assembly which, in turn, drives the pump source. The pump assembly is generally mounted within the internal cavity 92 of the housing proximate the first end, and is oriented so as to emit pump signals along an optical axis toward the second end of the housing. The cavity assembly (including the microresonator cavity 38 and alignment assemblies 14, 16) is also disposed within the internal cavity, albeit closer to the second end so as to receive the pump signals. In this regard, the optical axis upon which the pump assembly emits pump signals preferably aligns with the optical axis 18 of the mounting member 12 of the cavity assembly.

Reference is now made to FIGS. 11A–11C, which illustrate the housing 82 of the electro-optic system 80. The housing is generally made of a thermally conductive material, such as aluminum. The pump assembly 84 and cavity assembly 10 are preferably disposed such that the pump assembly and cavity assembly are in thermal contact with the housing. Thus, the thermally conductive housing can serve as a heat sink for the system, thereby drawing heat away from the components of the system. In addition, to further the ability of the housing to serve as a heat sink, the housing preferably has a large surface area from which to dissipate heat. For example, in the advantageous embodiment shown, the housing comprises a plurality of ribs 98 around the outer surface of the housing. Although not illustrated, the housing can additionally or alternatively include a fan for blowing air over the exterior ribbed surface of the housing to facilitate heat dissipation.

The pump assembly 84 can be mounted in the internal cavity 92 of the housing 82 in any one of a number of manners but, in the embodiment illustrated, the first end of the housing is closed, but defines a plurality of holes 99. The pump assembly can be inserted through the open second end of the housing such that the plurality of conductive pins 93 of the pump assembly extend through respective holes. In this regard, the pump assembly can be mounted within the housing proximate the first end 88 of the housing, with the conductive pens extending through respective holes. In the illustrated embodiment, the pump assembly can then be secured in place with distal portions the conductive pins external to the internal cavity. While the pump assembly can be secured in various manners, the conductive pins may be connected to respective pads or other portions of a printed circuit board (PCB) 101 positioned proximate an exterior surface of the first end of the housing, as shown in FIG. 13. In this embodiment, the PCB is electrically and mechanically connected to the conductive pins and can be secured to the housing, such as by screws, pins or the like, thereby also securing the pump assembly to the housing.

Once the pump assembly 84 is mounted proximate the first end 88 of the housing 82, and the cavity assembly 10 is inserted within the internal cavity, the end member 86 is generally disposed proximate the second end 90 of the housing. The end member can be disposed in any number of different manners but, in one preferred embodiment, the end member threadably engages the second end of the housing. To protect the cavity assembly from contaminants in the external environment, the end member and the pump assembly close the first and second ends of the housing to thereby isolate the internal cavity 92 of the housing. Again referring to FIG. 9, the system 80 can also include a pressure valve 94, such as a Schrader valve, for pressurizing the internal cavity to further protect the cavity assembly from the external environment, which might otherwise cause the optical elements to degrade over time. Additionally, the system can include a pressure indicator 96, such as a pressure indicator manufactured by Clippard Instrument Laboratory, Inc. of Cincinnati, Ohio. The pressure indicator is capable of snuggly fitting in an aperture 100 defined by the housing (see FIG. 11A) that otherwise opens into the internal cavity. As such, when the pressure in the internal cavity exceeds a predetermined level, the pressure indicator will pop out of the aperture to indicate that the internal cavity had been excessively pressurized.

As stated, to pressurize the internal cavity 92 of the housing 82, the housing or, in the illustrated embodiment, the end member 86 of the system 80 further includes the pressure valve 94. In this regard, attention is now drawn to FIGS. 12A–12C, which illustrate an end member of the system, according to one embodiment. As illustrated, the end member includes first 102 and second 104 ends and, similar to the housing, is preferably made from a thermally conductive material such as aluminum. The end member defines an internal cavity 105 that is coextensive with the internal cavity defined by the housing once the end member is mounted to the housing. The end member also preferably includes an opening 106 to the internal cavity of the end member to receive the pressure valve such that the internal cavity of the housing can be pressurized when the end member is mounted to the housing. The end member additionally defines an opening 108 to the internal cavity of the end member that is aligned generally along the optical axis. When the system is operated, laser pulses can therefore propagate through the opening defined by the end member. But because the internal cavity is preferably isolated from the external environment, as stated before, an optically transparent window 110 (shown in FIG. 13), such as anti-reflection coated glass, is preferably secured at least partially within the opening such that the internal cavities of both the end member and the housing remain isolated from the external environment, even though the laser pulses can be output therefrom.

The end member 86 can additionally include at least one attachment element for attaching the end member and, thus, the system 80 to an external object. For example, in the illustrated embodiment, the end member includes an attachment element defined by a plurality of curved slots 112. To attach the system to an external object, such as an external mounting surface, screws, pins or the like can extend through the curved slots and into the external object. The curved shape of the illustrated slots facilitates rotation of the system to thereby alter the direction of the polarization of the laser pulses emitted by the system relative to the external object.

Referring now to FIG. 13, another aspect of the present invention provides a method of packaging the electro-optic system 80. Generally, packaging the electro-optic system begins by providing the housing 82. The pump assembly 84 is then mounted at least partially within internal cavity 92 of the housing. As stated above, in one embodiment, the conductive pins 94 of the pump assembly extend through holes 99 associated with ones of the respective plurality of conductive pins. Also as stated above, the pump assembly can then be secured in place with distal portions of the conductive pins external to the internal cavity 92. For example, the conductive pins can be connected to respective pads or other portions of the PCB 101, positioned proximate the external surface of the first end 88 of the housing 82. In this embodiment, the PCB is electrically and mechanically connected to the conductive pins and is secured to the housing, such as by screws 114, pins or the like, thereby also securing the pump assembly to the housing.

After the pump assembly 84 is mounted, the cavity assembly 10 can be secured within the internal cavity 92 of the housing 82. The cavity assembly can be secured within internal cavity in any of a number of manners but, in a preferred embodiment, the mounting member 12 of the cavity assembly includes external threads, and the internal cavity includes internal threads 115 (see FIG. 1), for threading the mounting member and, thus, the cavity assembly, within the internal cavity. When secured within the internal cavity, the microresonator cavity 38 is preferably somewhat spaced from the pump source of the pump assembly 84. And although different spacings can be employed, the pump source is generally spaced from the microresonator cavity by 20+−0.5 microns. Also, when secured within the internal cavity, the optical axis upon which the pump assembly emits pump signals is preferably aligned with the optical axis 18 of the mounting member of the cavity assembly. To aid in securing the cavity assembly within the internal cavity, a retaining member 116 can be secured within the internal cavity proximate the cavity assembly opposite the pump assembly. In this regard, the retaining member is also preferably externally threaded.

Once the cavity assembly 10 and retaining member 116 have been secured within the internal cavity 92 of the housing 82, the second end 90 of the housing is closed. In this regard, in a preferred embodiment, the end member 86 is secured proximate the second end of the housing to close the internal cavity. The end member can be secured in any of a number of manners but, as stated above, the first end 102 of the end member can be threadably secured to the second end of the housing. The optically transparent window 110, can then be secured at least partially within the opening 108 defined by the end member, such as by using an adhesive epoxy. Alternatively, the optically transparent window can be secured to the end member prior to the end member being secured to the housing. In either event, a retaining member 118 can be secured within the opening defined by the end member to aid in securing the optically transparent window within the opening.

After the internal cavity 92 of the housing 82 is closed to the external environment, the internal cavity can be pressurized, such as by using the pressure valve 94 and pressure indicator 96. The pressure valve and pressure indicator can be affixed to the end member 86 and the housing, respectively, at any point prior to pressurizing the internal cavity. The internal cavity can be pressurized by pumping a desired gas or vapor from the internal cavity. The pressure indicator then indicates the desired pressure has been achieved within the internal cavity, as previously described. Once the desired pressure in the internal cavity has been achieved, the system 80 can be used in any one of a number of different applications. In this regard, the system could be attached to an external object, such as a post or an optical table.

The system 80 can be attached in any one of a number of manners but, as stated above, the end member 86 of one embodiment includes at least one attachment element. In embodiments where the end member defines a plurality of curved slots 112, screws, pins or the like can extend through the curved slots and into the external object. The curved shape of the illustrated slots facilitates rotation of the system to thereby alter the direction of the polarization of the laser pulses produced by the system relative to the external object. To identify the direction of polarization of the pulses, the system can include an identifier, such as a tick mark disposed at a predefined location on the housing or the end member, to indicate the direction of the liner polarization of the pulses produced by the system.

Although the electro-optic system has been described as illustrated in FIGS. 9–12, it will be appreciated that the electro-optic system, including the cavity assembly, can be embodied in any of a number of different forms without departing from the spirit and scope of the present invention. In this regard, reference is now made to FIG. 14, which illustrates an alternative embodiment of the electro-optic system according to the present invention. As shown in FIGS. 14A and 14B, the cavity assembly of the electro-optic system 120 includes a submount 122 mounted upon a heat sink 124. Although the heat sink can be a passive heat sink formed of thermally conductive material, such as a silver base plated with an alloy of gold and nickel, the heat sink can also be an active heat sink or heat pump such as a Peltier heat pump or other thermoelectric cooler. Therefore, the heat sink can comprise not only a heat sink that cools a component by accepting waste heat, but also a heat pump that generates additional heat in order to warm a component.

The submount 122 is formed of a thermally conductive material for providing a low thermal impedance path to the heat sink 124. The material which forms the submount is also electrically insulating so as to electrically isolate the various electro-optic components mounted upon the submount. Although the submount can be formed of a variety of thermally conductive, electrically insulating materials, the submount of one advantageous embodiment is formed of beryllium oxide, aluminum oxide or aluminum nitride which are both thermally conductive and electrically insulating.

In the illustrated embodiment, the microresonator cavity 38 is mounted upon the submount, such as by means of solder, an epoxy resin or other bonding agent, and the microresonator cavity defines an optical axis 125. To closely space the microresonator cavity with respect to one or more electro-optic components 126 within one or more alignment assemblies 128 (described below), the submount 122 is mounted upon the heat sink 124, and spaced apart therefrom, by means of a bracket 130. The submount and heat sink can be mounted to the bracket in any one of a number of different manners, including by means of solder, an epoxy resin or other bonding agent. The bracket can be made from a variety of different thermally conductive materials to transfer heat from the submount to the heat sink but, in one embodiment, the bracket is made from nickel-gold plated copper.

The submount assembly of the embodiment illustrated in FIG. 14 also includes a pump source 132, such as a laser diode, disposed proximate the microresonator cavity 38. In this regard, the pump source is at least partially aligned with the optical axis 125 of the microresonator cavity. As such, the output of the pump source pumps the active gain medium such that the microresonator cavity emits a series of laser pulses. The pump source is preferably spaced somewhat close, such as 20.+−0.5 microns, from the microresonator cavity. Thus, to closely space the pump source from the microresonator cavity 38, the pump source of the illustrated embodiment is mounted upon a pump mount 134, such as by means of solder, an epoxy resin or other bonding agent. In turn, the pump mount is secured to the bracket 130. Whereas the pump mount 134 can be secured to the bracket 130 in any one of a number of different manners, such as by means of solder, an epoxy resin or other bonding agent, the pump mount in the illustrated embodiment is secured to the bracket by means of a fastener, such as a screw. Also, whereas the pump mount can be made from a variety of different materials, like the bracket, in one embodiment the pump mount comprises nickel-gold plated copper. Thus, to electrically isolate the pump source 132 from the microresonator cavity 38, an electrically insulative pad (not shown) is preferably disposed between the pump source and the pump mount to thereby electrically isolate the pump source from the pump mount.

The cavity assembly also includes at least one alignment assembly 136 including a positioning member 137 (see FIGS. 4 and 5) and a wedge member 139 (see FIGS. 6 and 7), as such are described above. As also described above, each alignment assembly is capable of receiving an electro-optic component, such as a frequency doubling crystal (e.g., KTiOPO, or KTP) and/or a fourth harmonic generator (e.g., BBO). The alignment assembly is disposed downstream of the pump source 132 and the microresonator cavity 38. In this regard, in the illustrated embodiment, the cavity assembly also includes a holder 138, upon which the alignment assembly is secure. Thus, the holder can position the alignment assembly proximate the microresonator cavity, and at least partially align the electro-optic component with the optical axis 125 of the microresonator cavity.

The holder 138 can comprise a cylindrical-shaped structure that defines a cavity within which other elements of the cavity assembly are disposed, including the microresonator cavity 38, bracket 130, heat sink 124, pump source 132 and pump mount 134. The holder can comprise any of a number of different materials but, in one embodiment, the holder comprises anodized aluminum. One end of the holder can define an opening to the cavity along the optical axis of the microresonator cavity. In turn, the alignment assembly can be secured to the holder at least partially over the opening to thereby at least partially align the electro-optic component with the optical axis of the microresonator cavity.

As shown in FIGS. 14A and 14B, the cavity assembly is generally mounted within an internal cavity of a housing 140 comprising an electro-optic package, such as TO-8 package or a TO-3 package, as such are well known to those skilled in the art. The package generally includes a plurality of conductive pins 142 surrounding the cavity assembly. By establishing appropriate electrical connections between the conductive pins of the package and respective leads (not shown) of the cavity assembly, including the anode and the cathode of the pump source and any electrical leads associated with the heat sink 124, the electro-optic system can be operated by appropriately driving of the conductive pins of the electro-optic package. To allow laser pulses emitted from the microresonator cavity 38 to exit the package, the package preferably defines an opening located proximate the electro-optic component of the alignment assembly. However, to isolate the components of the cavity assembly from the external environment, an optically transparent window 144, such as anti-reflection coated glass configured to preferentially pass signals having the wavelength of the laser pulses emitted from the microresonator cavity, is preferably secured at least partially within the opening.

The present invention therefore provides a cavity assembly that includes at least one alignment assembly for aligning respective electro-optic components of an electro-optic system. The alignment assemblies hold the electro-optic components in a manner that does not allow for undesirable free rotating motion. Additionally, the present invention provides an electro-optic system that includes the cavity assembly and has a housing that serves to protect the cavity assembly from the external environment and dissipate heat, thus not requiring an independent heat sink.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An electro-optic system comprising:
   a housing defining an internal cavity, said housing comprised of a thermally conductive material;
   a pump assembly including a pump source, wherein said pump assembly is mounted at least partially within the internal cavity of said housing; and
   a cavity assembly comprising an active gain medium and at least one alignment assembly including at least one electro-optic component, wherein the at least one alignment assembly is disposed relative to the active gain medium such that the at least one electro-optic component is capable of being (i) positioned such that an optical axis of the electro-optic component is angularly displaced from an optical axis of the active gain medium and (ii) at least partially aligned with said active gain medium, wherein said at least one alignment assembly is rotatably disposed relative to said active gain medium such that relative rotation of said at least one alignment assembly and said active gain medium alters the angular displacement of the optical axis of the electro-optic component with respect to the optical axis of the active gain medium to thereby alter the alignment of the electro-optic component with respect to said active gain medium, and wherein said cavity assembly is disposed within the internal cavity of said housing such that said cavity assembly is in thermal contact with said housing to thereby permit heat transfer from the active gain medium to said housing.

2. An electro-optic system according to claim 1, wherein the internal cavity of said housing is isolated from an external environment so as to at least partially protect said cavity assembly from degradation.

3. An electro-optic system according to claim 1, wherein each alignment assembly comprises:
   a positioning member configured to receive a respective electro-optic component; and
   a wedge member including first and second major opposed surfaces, wherein the first surface is at an acute angle with respect to the second surface, wherein said wedge member is rotatably disposed relative to said positioning member such that relative rotation of said wedge member and said positioning member alters the alignment of the electro-optic component with respect to the active gain medium.

4. An electro-optic system according to claim 1 which produces an optical output having a predetermined polarization direction, and wherein said housing is configured to be rotatably mounted to an object such that the predetermined polarization direction of the optical output is capable of being rotated to a predefined orientation with respect to the object.

5. An electro-optic system according to claim 1 wherein said housing comprises a plurality of ribs.

6. An electro-optic system according to claim 1, wherein said cavity assembly further comprises a support assembly and a mounting member, wherein the active gain medium is mounted to the support assembly, and wherein the support assembly is secured to the mounting member.

7. An electro-optic system according to claim 6, wherein the mounting member of said cavity assembly is secured within the internal cavity defined by said housing such that the mounting member is in thermal contact with said housing.

8. An electro-optic system according to claim 6, wherein the mounting member of said cavity assembly is threadably secured within the internal cavity defined by said housing.

9. An electro-optic system according to claim 6, wherein at least one alignment assembly is secured to the mounting member of said cavity assembly.

10. An electro-optic system according to claim 1, wherein the at least one alignment assembly comprises a first alignment assembly and a second alignment assembly, wherein the first alignment assembly includes a first electro-optic component, wherein the second alignment assembly includes a second electro-optic component, and wherein the first electro-optic component is different from the second electro-optic component.

11. An electro-optic system according to claim 10, wherein the first and second electro-optic components are selected from a group comprising a frequency doubling element and a fourth harmonic generator.

12. An electro-optic system according to claim 11, wherein the frequency doubling element comprises KTiOPO, and wherein the fourth harmonic generator comprises Beta-Barium Borate crystal.

13. A cavity assembly comprising:
    an active gain medium;
    at least one electro-optic component;
    at least one positioning member configured to receive the at least one electro-optic component such that the at least one electro-optic component is at least partially aligned with said active gain medium; and
    at least one wedge member including first and second major opposed surfaces, wherein the first surface is at an acute angle with respect to the second surface, wherein said at least one wedge member is rotatably disposed relative to a respective positioning member such that relative rotation of said at least one wedge member and the respective positioning member alters the alignment of the electro-optic component with respect to the active gain medium.

14. A cavity assembly according to claim 13, wherein said at least one positioning member is configured to receive said at least one electro-optic component such that said at least one electro-optic component is at an angle from an optical axis.

15. A cavity assembly according to claim 13, wherein said at least one positioning member comprises a first positioning member and a second positioning member, wherein said at least one wedge member comprises a first wedge member and a second wedge member, wherein the first positioning member is configured to receive a first electro-optic component, wherein the second positioning member is configured to receive a second electro-optic component, and wherein the first electro-optic component is different from the second electro-optic component.

16. A cavity assembly according to claim 15, wherein the first and second electro-optic components are selected from a group comprising a frequency doubling element and a fourth harmonic generator.

17. A cavity assembly according to claim 16, wherein the frequency doubling element comprises KTiOPO, and wherein the fourth harmonic generator comprises Beta-Barium Borate crystal.

18. A cavity assembly comprising:
    an active gain medium;
    at least one electro-optic component; and
    at least one alignment assembly configured to receive the at least one electro-optic component such that the at least one electro-optic component is at least partially aligned with said active gain medium, wherein said at least one alignment assembly is rotatably disposed relative to said active gain medium such that relative rotation of said at least one alignment assembly and said active gain medium alters the alignment of the electro-optic component with respect to said active gain medium and wherein each alignment assembly component:
    a positioning member configured to receive a respective electro-optic component; and
    a wedge member including first and second major opposed surface, wherein the first surface is at an acute angle with respect to the second surface, wherein said wedge member is rotatably disposed relative to said respective positioning member such that relative rotaion of said wedge member and said positioning member alters the alignment of the respective electro-optic component with respect to said active gain medium.

19. A cavity assembly according to claim 18 wherein said positioning member is configured to receive the respective electro-optic component such that said electro-optic component is at an angle from an optical axis.

20. A cavity assembly according to claim 18, wherein said at least one alignment assembly comprises a first alignment assembly and a second alignment assembly, wherein the first alignment assembly is configured to receive a first electro-optic component, wherein the second alignment assembly is configured to receive a second electro-optic component, and wherein the first electro-optic component is different from the second electro-optic component.

21. A cavity assembly according to claim 20, wherein the first and second electro-optic components are selected from a group comprising a frequency doubling element and a fourth harmonic generator.

22. A cavity assembly according to claim 21, wherein the frequency doubling element comprises KTiOPO, and wherein the fourth harmonic generator comprises Beta-Barium Borate crystal.

23. A method of packaging an electro-optic system comprising:
    providing a housing defining an internal cavity and comprised of a thermally conductive material;
    mounting a pump assembly including a pump source at least partially within the internal cavity of the housing;
    securing a cavity assembly within the internal cavity defined by the housing, wherein the cavity assembly comprises an active gain medium and at least one alignment assembly including at least one electro-optic component, wherein the at least one alignment assembly is disposed relative to the active gain medium such that the at least one electro-optic component is capable of being (i) positioned such that an optical axis of the electro-optic is angularly displaced from an optical axis of the active gain medium, and (ii) at least partially aligned with the active gain medium, wherein securing the cavity assembly within the internal cavity defined by the housing comprises providing relative rotation between the at least one alignment assembly and the active gain medium to alter the angular displacement of the optical axis of the respective electro-optic component with respect to the optical axis of the active gain medium to thereby alter the alignment of the respective electro-optic component with respect to the active gain medium, wherein securing the cavity assembly within the internal cavity defined by the housing also comprises establishing thermal contact between the cavity assembly and the housing to thereby permit heat transfer from the active gain medium to the housing, and wherein securing the cavity assembly within the internal cavity defined by the housing comprises at least partially aligning the active gain medium with the pump source such that an output of the pump source is capable of pumping the active gain medium; and closing the internal cavity defined by the housing to thereby isolate the internal cavity from an external environment so as to at least partially protect the cavity assembly from degradation.

24. A method of packaging a cavity assembly comprising: providing an active gain medium; and positioning at least one alignment assembly relative to the active gain medium, wherein each alignment assembly includes an electro optical component capable of being (i) positioned such that an optical axis of the electro optic component is angularly displaced from an optical axis of the active gain medium, and (ii) at least partially aligned with the active gain medium, and wherein positioning the at least one alignment assembly comprises providing relative rotation between the at least one alignment assembly and the active gain medium to alter angular displacement of the optical axis of the respective electro-optic component with respect to the optical axis of the active gain medium to thereby alter the alignment of the respective electro-optic component with respect to the active gain medium.

25. A method according to claim 24 further comprising aligning the active gain medium at least partially along an optical axis.

26. A method according to claim 24, wherein the at least one alignment assembly comprises a first alignment assembly and a second alignment assembly, wherein positioning the at least one alignment assembly comprises positioning the first and second alignment assemblies, wherein positioning the first alignment assembly comprises securing a first electro-optic component to the first alignment assembly and thereafter positioning the first alignment assembly, wherein positioning the second alignment assembly comprises securing a second electro-optic component to the second alignment assembly and thereafter positioning the second alignment assembly, and wherein the first electro-optic component is different from the second electro-optic component.

27. An electro-optic system comprising:

a housing defining an internal cavity;

an active gain medium disposed within the internal cavity defined by said housing; and at least one alignment assembly disposed within the internal cavity defined by said housing, wherein said at least one alignment assembly is configured to receive at least one electro-optic component such that the at least one electro-optic component is at least partially aligned with said active gain medium, wherein said at least one alignment assembly is rotatably disposed relative to said active gain medium such that relative rotation of said at least one alignment assembly and said active gain medium alters the alignment of the electro-optic component with respect to said active gain medium and wherein each alignment assembly comprises:

a positioning member configured to receive a respective electro-optic component; and a wedge member including first and second major opposed surfaces, wherein the first surface is at an acute angle with respect to the second surface, wherein said wedge member is rotatably disposed relative to said respective postioning member such that relative rotation of said wedge member and said positioning member alters the alignment of the respective electro optic component with respect to said active gain medium.

28. An electro-optic system according to claim 27 further comprising a pump source disposed proximate said active gain medium on a side of the active gain medium opposing said at least one alignment assembly.

29. An electro-optic system according to claim 27 further comprising:

a submount mounted to said active gain medium, wherein said submount comprises a thermally conductive material to thereby transfer heat from said active gain medium; and a heat sink in thermal communication with said submount, wherein said heat sink is capable of receiving heat from the submount to thereby transfer heat from said active gain medium.

30. An electro-optic system according to claim 29 further comprising a bracket mounted to said submount and said heat sink, wherein said bracket is mounted between said submount and said heat sink such that said submount and said heat sink are spaced apart.

31. An electro-optic system according to claim 30 further comprising:

a pump mount secured to said bracket proximate said active gain medium on a side of the active gain medium opposing said at least one alignment assembly; and a pump source mounted to said pump mount.

32. A cavity assembly according to claim 27, wherein said positioning member is configured to receive the respective electro-optic component such that said electro-optic component is at an angle from an axis defined by said active gain medium.

\* \* \* \* \*